(12) United States Patent
Hedtke

(10) Patent No.: US 7,434,469 B2
(45) Date of Patent: Oct. 14, 2008

(54) REMOTE SEAL INSTALLATION IMPROVEMENTS

(75) Inventor: Robert Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 232 days.

(21) Appl. No.: 11/441,707

(22) Filed: May 26, 2006

(65) Prior Publication Data

US 2007/0272027 A1    Nov. 29, 2007

(51) Int. Cl.
*F16J 3/00* (2006.01)
(52) U.S. Cl. .......................... 73/706; 73/756
(58) Field of Classification Search .............. 73/756; 242/378.1
See application file for complete search history.

(56) References Cited

U.S. PATENT DOCUMENTS

| | | | |
|---|---|---|---|
| 3,695,544 A | 10/1972 | Morey, Sr. | |
| 3,999,640 A | 12/1976 | Persson | |
| 4,132,367 A | 1/1979 | Ineson et al. | |
| 4,577,693 A | 3/1986 | Graser | |
| 4,646,985 A | 3/1987 | Goyau et al. | |
| 4,733,832 A | 3/1988 | Napierski | |
| 4,901,938 A | 2/1990 | Cantley et al. | |
| D322,528 S | 12/1991 | Matheopoulos | |
| 5,103,977 A | 4/1992 | Douglas | |
| 5,114,091 A | 5/1992 | Peterson et al. | |
| 5,439,109 A | 8/1995 | McBride | |
| 5,762,281 A | 6/1998 | Foley | |
| 6,186,433 B1 | 2/2001 | Kovacik et al. | |
| RE37,283 E | 7/2001 | Kluth et al. | |
| 6,347,462 B1 | 2/2002 | Steinich | |
| 6,561,450 B1 | 5/2003 | Walsh | |
| 6,595,452 B1 | 7/2003 | Berthaud et al. | |
| 6,626,390 B2 | 9/2003 | Albert et al. | |
| 6,943,697 B2 | 9/2005 | Ciglenec et al. | |
| 2005/0184186 A1 | 8/2005 | Tsoi et al. | |

*Primary Examiner*—Andre J Allen
(74) *Attorney, Agent, or Firm*—Kinney & Lange, P.A.

(57) ABSTRACT

A process control system includes a transmitter having transmitter circuitry, a sensor, a remote sensing apparatus, a linkage and a slack take-up device. The sensor senses a process variable of a process fluid. The remote sensing apparatus communicating with the process fluid. The linkage communicates between the transmitter and the process fluid. The slack take-up device selectively adjusts a relative length of the linkage between the transmitter and the remote sensing apparatus.

27 Claims, 4 Drawing Sheets

REMOTE SEAL INSTALLATION IMPROVEMENTS

BACKGROUND OF THE INVENTION

This invention relates generally to process instruments used in industrial process control systems. More particularly, the present invention relates to transmitters having a slack take-up device for remote sensing apparatuses.

In one type of process control system, a pressure transmitter is used to remotely monitor the pressure of a process fluid. The pressure transmitter includes circuitry that conditions an electrical output of a pressure sensor and transmits it to a remote location where it can be monitored as representing the magnitude of the pressure. Remote seals, or remote diaphragm assemblies, are often used to distance the pressure transmitter from hazardous measurement environments, or for linking the pressure transmitter with inconveniently located process fluids. For example, remote seals are often used with corrosive or high temperature process fluids such as in chemical plants or oil refineries. Typically, in those situations, a mechanical remote seal having a diaphragm assembly and a capillary tube is used to relate the pressure transmitter to the process fluid through a hydraulic fill fluid, while the pressure transmitter is located a safe distance away. The flexible diaphragm isolates the process fluid from the fill fluid used in the capillary tube. As the diaphragm flexes, the incompressible fill fluid translates pressure change through the capillary tube to a diaphragm located in the pressure transmitter. Deflection of a pressure transmitter diaphragm is transmitted through another fill fluid to a pressure sensor, which produces a signal relating to the pressure of the process fluid.

Capillary tubes can extend tens of meters in order to couple the pressure transmitter with the process fluid. Because of costs and difficulty associated with customizing the length of the capillary tube, remote seal assemblies are typically made available with stock lengths of capillary tube. Often times, however, the remote seal comes with an excessive length of capillary tube for some applications. Also, for differential pressure measurement in balanced configurations, where two remote seals are used with equal lengths of capillary tubing in order to equalize back pressure, one of the capillary tubes is typically longer than necessary for the application. Due to the sensitive nature of the sensors and remote seals, which are pre-filled with a precise amount of fill fluid at the factory, it is impractical to adjust the length of capillary tubes in the field. Thus, it becomes necessary in field environments to deal with excess lengths of capillary tube in order to ensure their security and pressure transmission performance. However, it is often the case that the capillaries are jumbled up or stashed such that they may easily become crimped, cut or otherwise compromised, which also affects their pressure transmission capabilities. As such, there is a need to eliminate the problems associated with excessive capillary lengths in remote seal assemblies.

BRIEF SUMMARY OF THE INVENTION

The present invention is directed toward a process control system having a slack take-up device for a remote sensing apparatus. The process control system includes a transmitter having transmitter circuitry, a sensor, a remote sensing apparatus, a linkage and a slack take-up device. The sensor senses a process variable of a process fluid. The remote sensing apparatus communicates with the process fluid. The linkage communicates between the transmitter and the process fluid. The slack take-up device selectively adjusts a relative length of the linkage between the transmitter and the remote sensing apparatus.

DETAILED DESCRIPTION

Figure 1:
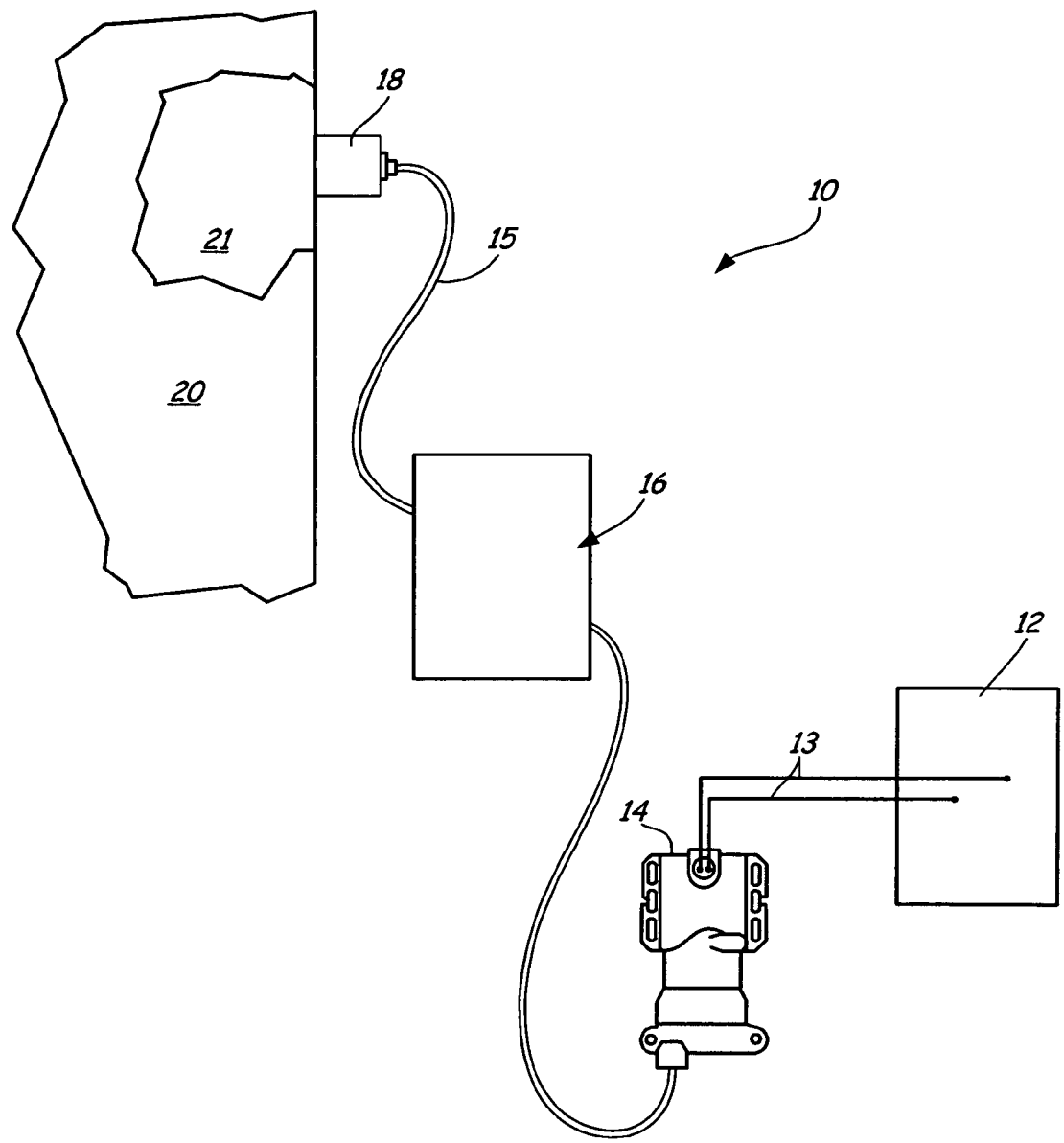
FIG. 1 shows a process control system having a remote sensing apparatus slack take-up device.

FIG. 1 shows process control system 10, which includes control room 12, control loop 13, process transmitter 14, flexible linkage 15, slack take-up device 16, remote sensing apparatus 18, vessel 20 and process fluid 21. Vessel 20 may be any container used to accommodate a process fluid, such as a pipeline or a storage tank. Process fluid 21 may, therefore, be a petrochemical, an acid or any other fluid. Process transmitter 14 is used to sense a process variable, such as temperature or pressure, of process fluid 21 and transmit the magnitude of that variable to control room 12 over control loop 13. Process control loop 13 can be, for example, a 4-20 mA control loop, a wired digital communication network, a wireless network or any other suitable communication system. Thus, process transmitter 14 can be situated a distance away from control room 12, such as on a factory floor or on a pipeline, or be otherwise remotely situated.

Remote sensing apparatus 18 extends the reach of transmitter 14 through flexible linkage 15. Remote sensing apparatus may be, for example, an RTD probe for a temperature transmitter or a remote seal assembly for a pressure transmitter, but could also be any device extendable from a process transmitter by way of cable or tubing. Flexible linkage 15 can be any mechanical or electric communication means, such as wiring, cabling or tubing. In various embodiments, linkage 15 comprises stainless steel hydraulic tubing or electrical wiring encased in a flexible sheathing. Thus, process transmitter 14 can be installed at a safe and secure position, while remote sensing apparatus 18 can extend into more hazardous or inconveniently located positions.

Slack take-up device 16 provides a means for adjusting the relative length of flexible linkage 15 between transmitter 14 and apparatus 18 without interfering with the operation of process control system 10. Device 16 comprises a spool or reel for winding the length of flexible linkage 15 in excess of what is needed to span the distance between transmitter 14 and apparatus 18. Slack take-up device 16 is typically manually operated, but, in other embodiments can be automated with, for example, an electric motor. Thus, slack take-up device maintains flexible linkage 15 in a neat and orderly fashion and prevents damage from being inflicted upon flexible linkage 15 from improper storage or handling, amongst other advantages that are apparent in the various embodiments of process control system 10.

Figure 2:
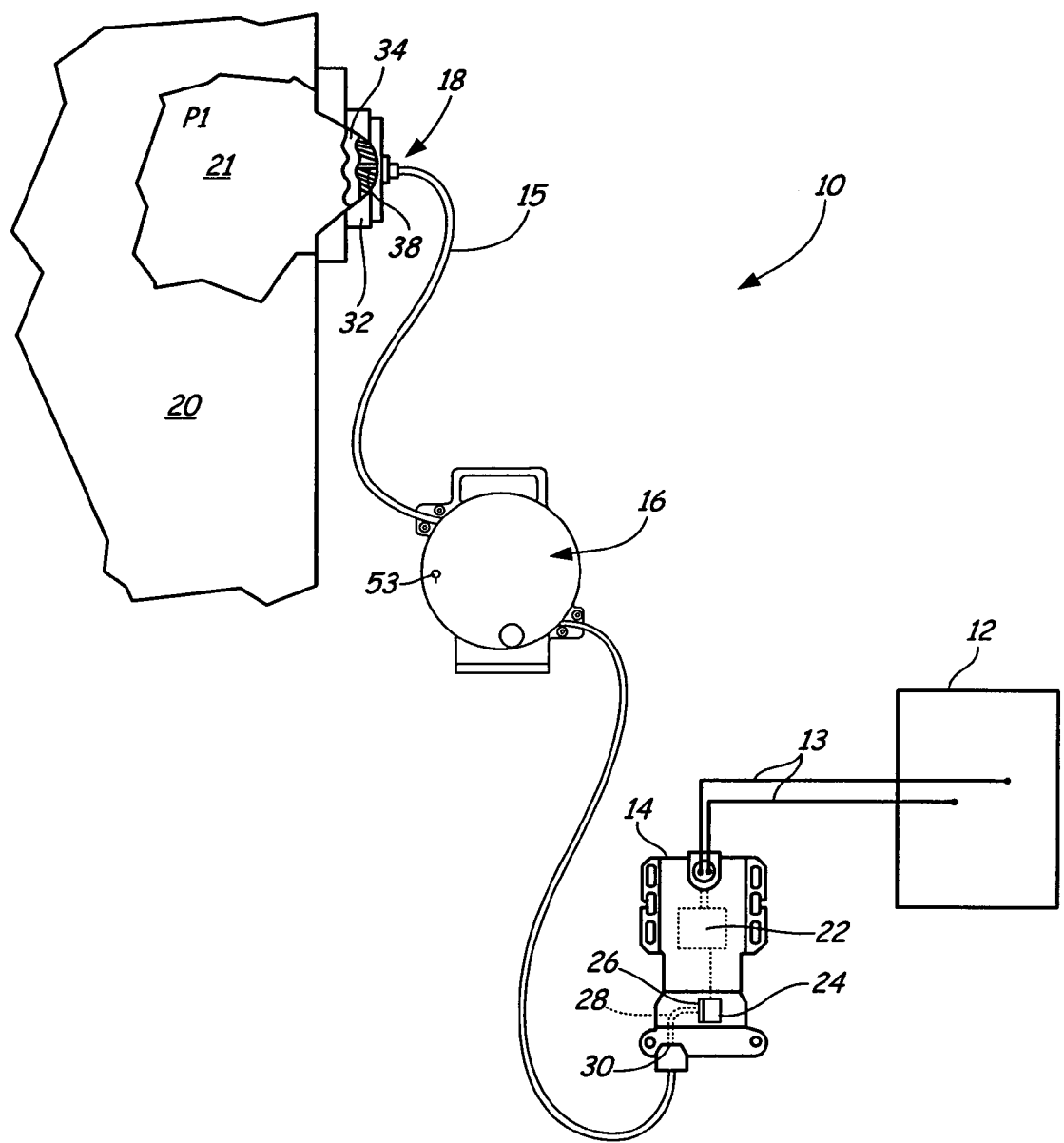
FIG. 2 shows one embodiment of a process control system in which a capillary tube connects a remote seal with a pressure transmitter.

FIG. 2 shows one embodiment of process control system 10 in which process transmitter 14 comprises a pressure transmitter, flexible linkage 15 comprises a capillary tube and remote sensing apparatus 18 comprises a remote seal. Pressure transmitter 14 is comprised of transmitter circuitry 22, sensor 24, sensor diaphragm 26, passageway 28 and process diaphragm 30. Remote seal 18 includes capillary 15, flange 32, remote diaphragm 34 and fill fluid 38. Take-up device 16 is disposed on capillary 15 between transmitter 14 and remote seal 18. Process control system 10 is used to remotely measure pressure P1 of process fluid 21 with transmitter 14, such that the information obtained can be monitored at control room 12 through control loop 13. Remote seal 18 is used to distance pressure transmitter 14 from hazardous environments or for linking pressure transmitter 14 with inconveniently located process fluids, such as at vessel 20. Slack take-up device 16 adjusts the relative length of capillary 15 between transmitter 14 and remote seal 18 without interrupting capillary 15, thereby allowing continuous operation of pressure transmitter 14. Process transmitter 14 is shown as an absolute pressure gauge having one remote seal 18. In other embodiments, process transmitter 14 is fitted with a second remote seal so that differential pressure can be sensed. In such a configuration, an additional capillary may be used in either a tuned or balanced configuration, which may have an associated slack take-up device.

Sensor 24 of process transmitter 14 is mechanically connected with process fluid 21 through hydraulic fill fluids present in passageway 28 and capillary 15. Remote diaphragm 34 separates process fluid 21 from capillary 15, process diaphragm 30 separates passageway 28 from capillary 15, and sensor diaphragm 26 separates passageway 28 from sensor 24. Capillary 15 is filled with a first fill fluid, and passageway 28 is filled with a second fill fluid. Sensor 24 senses a change in pressure P1 of process fluid 21 through the first and second fill fluids. Pressure P1 exerts a force on remote diaphragm 34, which is transmitted from remote diaphragm 34 by the first fill fluid of capillary 15 to process diaphragm 30 of passageway 28, such that the pressure in capillary 15 equals pressure P1. The force associated with P1 is transmitted from process diaphragm 30 to pressure diaphragm 26 by the second fill fluid, such that the pressure in passageway 28 equals pressure P1 and is thus applied to sensor 24.

Typically, sensor 24 is a transducer that produces an electrical signal in response to a change in pressure P1 as presented through the fill fluids. Sensor 24 is in electronic communication with transmitter circuitry 22, which processes and transmits the output of sensor 24 to control room 12 over control loop 13. Alternatively, circuitry 22 can display the output of sensor 24 on a local LCD screen contained within transmitter 14. In other embodiments, transmitter circuitry 22 communicates over a wireless network, or is not connected with control room 12. In yet another embodiment, the output of circuitry 22 is readable by a handheld device linked by wires or wirelessly with process transmitter 14. Thus, pressure P1 is transmitted from vessel 20 to transmitter 14 through capillary 15, and is then transmitted electronically to control room 12 through control loop 13.

In order to maintain the accuracy of process control system 10, the integrity of capillary 15 must be carefully maintained. Capillary 15 comprises pliable stainless steel tubing that is enclosed in a flexible steel sheathing. The inner tubing provides a sealed link between remote diaphragm 34 and process diaphragm 30 and is easily damaged. The outer steel casing serves to protect the inner tubing, while maintaining a degree of flexibility. The magnitude of the electrical output produced by sensor 24 is based on the pressure of process fluid 21, as presented to sensor 24 through the first and second fill fluids. The amount of force that is transmitted to sensor 24 depends on the quality and quantity of the first fill fluid present in capillary 15 (and the second fill fluid present in passageway 28), and its ability to convey pressure between remote diaphragm 34 and process diaphragm 30 without obstruction. Pressure transmitter 14 is calibrated, typically at the factory, having a precise, fixed amount of first fill fluid in capillary 15. In the event any fill fluid leaks out of capillary 15, the accuracy of pressure transmitter 14 is reduced, and inaccurate output is produced by sensor 24.

The integrity of capillary 15 can become compromised in the field through accidental damage or, in extreme circumstances through excessive wear and tear. Capillary 15 also, however, becomes damaged due to mishandling or carelessness in storage and installation of control system 10. Capillary 15 often times is jumbled up or stashed in such a manner as to become crimped, cut or otherwise compromised. In addition to causing leaks, which obviously affect the accuracy of sensor 24, crimps or other sharp bends in capillary 15 impede the ability of the first fill fluid from relaying pressure P1 to process diaphragm 30.

These problems are compounded by capillary 15 being made available in standard lengths from the factory, which often results in excess amounts of capillary tube 15 for some applications. Due to the complexity of the factory sealed capillary assembly and the precision factory calibration of control system 10, it is impractical to shorten the length of capillary 15 after installation so that excess lengths do not need to be stored or stashed and thereby avoiding unnecessary opportunity for damage. Therefore, capillary 15 is fitted with slack take-up device 16. Slack take-up device provides a neat and orderly way for shipping and installing capillary 15 and storing excess amounts of capillary 15 without interfering with its operation or calibration.

Figure 3:
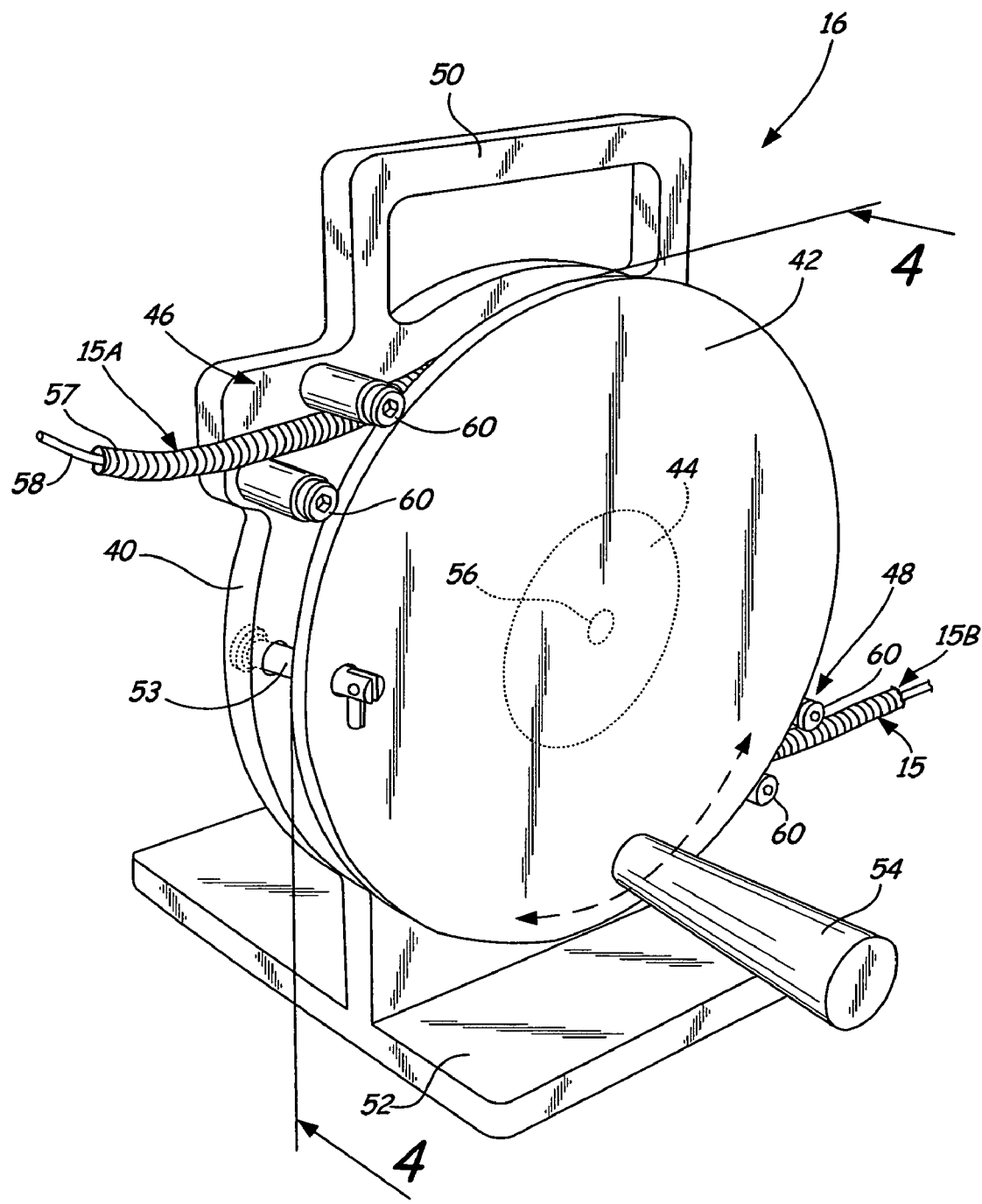
FIG. 3 shows a perspective view of the front of one embodiment of a slack take-up device for a capillary tube.

FIG. 3 shows a perspective view of the front of one embodiment of slack take-up device 16 of the present invention. Device 16 comprises first plate 40 and second plate 42, between which capillary 15 is wound around spool 44 (shown in phantom). First plate 40 includes first guide 46 and second guide 48, carry handle 50, pedestal 52 and locking pin 53. Second plate 42 includes spool 44 and crank handle 54. Carry handle 50, which provides a ready way of transporting or mounting device 16, and pedestal 52, which provides a simple means for storing device 16, are optional features that are included for ease of use and convenience. Other features, such as mounting bores, hooks or brackets, can be included on first plate 40 or second plate 42 to facilitate use, handling and storage of device 16. For example, pedestal 52 or first plate 40 may include mounting bores so that device 16 may be mounted to a wall or mounting post. First plate 40 and second plate 42 can be comprised of any material having suitable properties for the particular environment in which it will operate. Such properties include resiliency to harsh conditions, structural stability, heat resistance, or oil resistance. Such materials include aluminum, plastic or wood.

Second plate 42 is rotatably secured to first plate 40 with, for example, threaded fastener 56, and can be manually rotated with handle 54. Capillary 15 uninterruptedly passes through spool 44, and is comprised of stainless steel sheathing 57 and flexible steel tubing 58. First end 15A of capillary 15 passes through guide 46 and second end 15B passes through guide 48. Guide 46 and guide 48 are positioned on flanges extending out from opposite ends of first plate 40. Guide 46 and guide 48 are comprised of, for example, a pair of threaded fasteners 60 that span the distance between first plate 40 and second plate 42 and prevent the circumferential windings of capillary 15 from expanding beyond the perimeter of device 16.

As spool 44 is rotated (clockwise for the embodiment and orientation of device 16 in FIG. 3) by handle 54 and second plate 42, capillary 15 is wound around spool 44 from both first end 15A and second end 15B simultaneously. The width of spool 44 can be slightly larger than the width of capillary 15 to allow for a single, concentric winding of capillary 15. In other embodiments, the width of spool 44 is wider to allow parallel windings of capillary 15 in order to, for example, accept longer lengths of capillary 15 with the same diameter of plates 40 and 42. Steel sheathing 57 protects steel tubing 58 as they flex and are drawn past guides 46 and 48. Guides 46 and 48 prevent capillary 15 from unwinding and maintain capillary 15 wound in a bi-directional configuration. Guides 46 and 48 keep first end 15A and second end 15B extending outwardly from opposite ends of spool 44 such that capillary 15 can be easily extended and contracted between transmitter 14 and remote seal 18. The shape of spool 44 permits capillary 15 to be wound and extended in an orderly fashion without interrupting the operation of control system 10. Locking pin 53 prevents movement of second plate 42 with respect to first plate 40 such that capillary 15 cannot be unwound, such with handle 54, pulling on either end 15A or 15B, or some other force. Locking pin 53 is inserted through a hole in second plate 42 and into and through a hole in first plate 40 to prevent unwinding of spool 44. In one embodiment, first plate 40 includes a plurality of holes such that second plate 42 can be locked in a plurality of positions. Locking pin 53 can be any suitable fastening means such as a cotter pin, threaded fastener, clevis pin or a spring biased detent.

Figure 4:
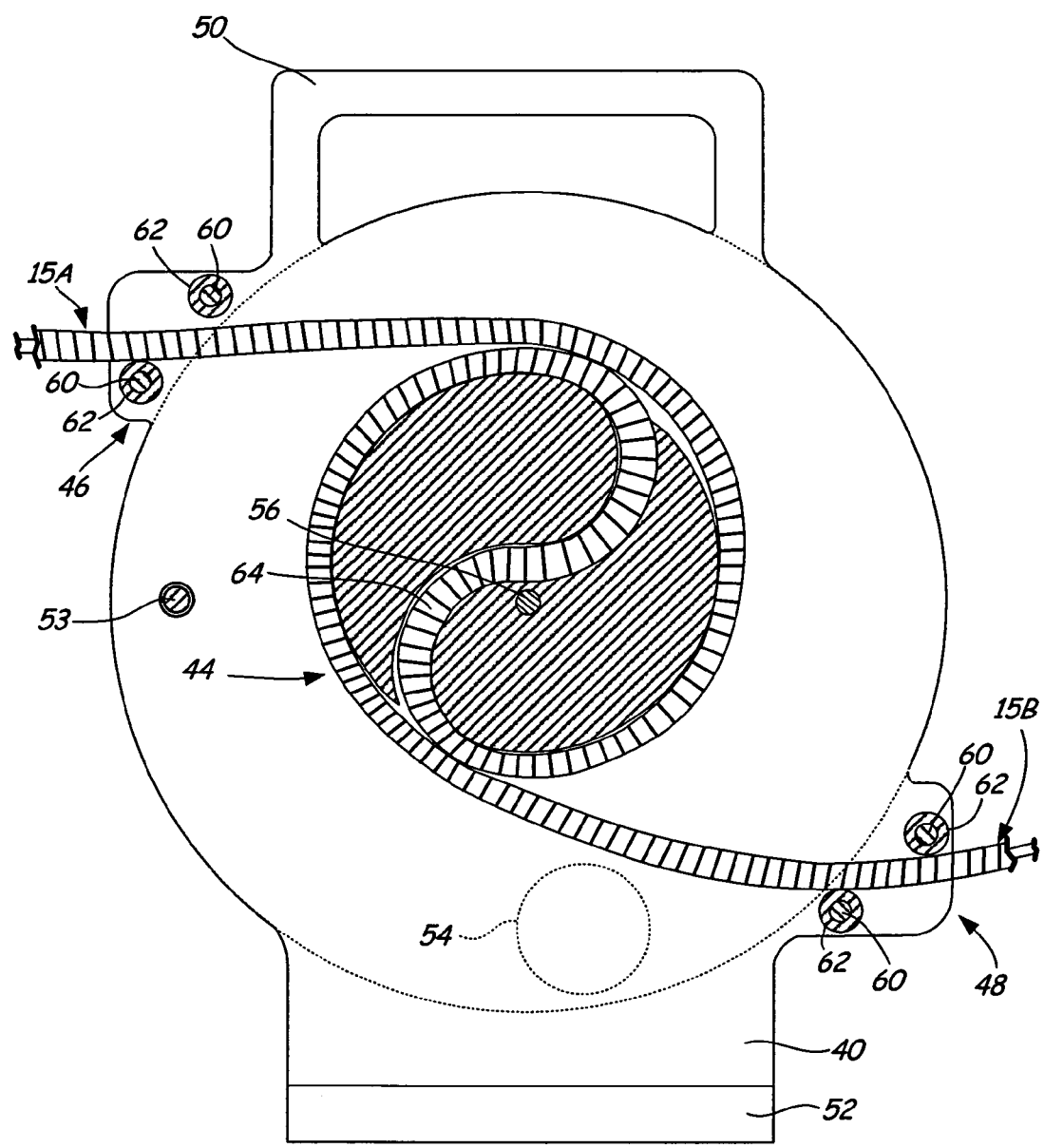
FIG. 4 shows a section view of the slack take-up device of FIG. 3 taken through the spool.

FIG. 4 shows a front view of slack take-up device 16 taken through spool 44 of second plate 42. Spool 44, guide 46 and guide 48 are shown in section, handle 54 is shown in phantom. The shape of spool 44 permits capillary 15 to wind-up without slipping when handle 54 is cranked (counterclockwise for the embodiment and orientation of device 16 in FIG. 4). Spool 44 also allows controlled unwinding of capillary 15 when first end 15A and second end 15B are pulled outward away from spool 44 through guide 46 and guide 48. To aid in winding and unwinding of capillary 15, threaded fasteners 60 of guides 46 and 48 include rotatable bushings 62 that facilitate movement of and prevent damage to capillary 15.

Spool 44 comprises a "yin-yang" type shape that allows capillary 15 to be placed through spool 44. Spool 44 is comprised of two opposing teardrop shaped projections that form a central channel. Capillary 15 can be laid through channel 64 without interrupting, impeding or otherwise altering the shape or flow of capillary 15. First end 15A and second end 15B of capillary 15 are then wound around spool 44 in the same direction such that one end each can be extended through guide 46 and guide 48. The yin-yang shape facilitates the bi-directional unwinding of capillary 15. The yin-yang shape grabs capillary 15 to prevent slipping of capillary 15 around spool 44 during winding up of capillary 15, but also prevents sharp bending or capillary 15 in order to prevent kinks. Additionally, this type of configuration allows device 16 to be installed or removed from system 10 without uninstalling system 10 or any of its components by simply unsecuring fastener 56. Since channel 64 runs generally through the center of spool 44, fastener 56 is offset from the center so that it is positioned within one of the tear drop shaped projections. In other embodiments, channel 64 need not run through the center of spool 44, and fastener 56 can extend through the center of spool 44. Channel 64 can be comprised of any shape in which capillary 15 can lay uninterruptedly and which facilitates gripping of capillary 15 during winding. Thus, spool 44 can be comprised of any suitable shape in different embodiments of the present invention.

Although the present invention has been described with reference to preferred embodiments, workers skilled in the art will recognize that changes may be made in form and detail without departing from the spirit and scope of the invention.

The invention claimed is:

1. A remote seal assembly for connecting a pressure transmitter with a process fluid, the remote seal assembly comprising:
   a process flange including a pressure diaphragm for interfacing with the process fluid;
   a capillary tube for communicating a pressure of the process fluid from the pressure diaphragm to the pressure transmitter via a fill fluid; and
   a slack take-up device for selectively adjusting a relative length of the capillary tube between the remote seal assembly and the pressure transmitter.

2. The remote seal assembly of claim 1 wherein the slack take-up device comprises a spool configured for bi-directionally winding the capillary tube.

3. The remote seal assembly of claim 2 wherein the spool is yin-yang shaped.

4. The remote seal assembly of claim 2 wherein the spool includes a channel for uninterruptedly receiving the capillary tube.

5. The remote seal assembly of claim 4 wherein the channel prevents sharp bending of the capillary.

6. The remote seal assembly of claim 1 wherein the slack take-up device is removably connected with the system.

7. The remote seal assembly of claim 1 wherein the slack take-up device includes mounting features.

8. The remote seal assembly of claim 1 wherein the slack take-up device includes guides for directing bi-directional winding of the capillary and preventing unwinding of the capillary.

9. The remote seal assembly of claim 8 wherein the guides include rotatable guide posts for facilitating smooth winding of the capillary.

10. The seal assembly of claim 1 wherein the slack take-up device includes a lock to prevent unwinding of the capillary.

11. A slack take-up device for adjusting the length of a capillary tube between a remote seal assembly and a pressure transmitter, the slack take-up device comprising:
    a rotatable spool comprising an arcuate channel extending continuously through an interior of the rotatable spool uninterruptedly receiving the capillary tube; and
    a cranking mechanism for winding the capillary tube around the spool to adjust a relative length of the capillary tube.

12. The slack take-up device of claim 11 wherein the rotatable spool includes a lock to prevent rotation of the spool relative to the slack take-up device.

13. The slack take-up device of claim 11 wherein the spool is configured for bi-directionally winding the capillary tube.

14. The slack take-up device of claim 11 wherein the spool is yin-yang shaped.

15. The slack take-up device of claim 11 wherein the channel is configured to prevent sharp bending of the capillary.

16. The slack take-up device of claim 11 and further comprising guides positioned at an outer periphery of the device for directing bi-directional winding of unwound portions of the capillary onto the spool and preventing unwinding of wound portions of the capillary from the spool.

17. The slack take-up device of claim 16 wherein the guides include rotatable guide posts for facilitating smooth winding of the capillary.

18. A process control system comprising:
    a transmitter including transmitter circuitry;
    a sensor for sensing a process variable of a process fluid;

a remote sensing apparatus for communicating with the process fluid;

a linkage for communicating between the transmitter and the remote sensing apparatus; and a slack-take up device connected to the linkage between the remote sensing apparatus and the transmitter.

19. The process control system of claim 18 wherein the slack take-up device adjusts the linkage length without interruption of the linkage.

20. The process control system of claim 18 wherein the linkage comprises a capillary tube.

21. The process control system of claim 18 wherein the sensor comprises an RTD.

22. The process control system of claim 18 wherein the sensor comprises a pressure sensor.

23. The process control system of claim 18 wherein the slack take-up device comprises a spool for bi-directionally winding the linkage.

24. The process control system of claim 23 wherein the spool is yin-yang shaped.

25. The process control system of claim 18 wherein the slack take-up device is configured to prevent sharp bending of the capillary.

26. The slack take-up device of claim 11 wherein the arcuate channel extends through the spool in an S-shaped route.

27. The slack take-up device of claim 11 wherein the rotatable spool is comprised of opposing teardrop shaped bodies between which is disposed the arcuate channel.

* * * * *